(12) United States Patent
Keiser

(10) Patent No.: US 6,257,272 B1
(45) Date of Patent: Jul. 10, 2001

(54) PORTABLE ERECTABLE TOWER

(76) Inventor: Keril M. Keiser, P.O. Box 720810, Pinion Hills, CA (US) 92372

( * ) Notice: Subject to any disclaimer, the term of this patent is extended or adjusted under 35 U.S.C. 154(b) by 0 days.

(21) Appl. No.: 09/692,798

(22) Filed: Oct. 20, 2000

Related U.S. Application Data

(60) Provisional application No. 60/160,854, filed on Oct. 21, 1999.

(51) Int. Cl.⁷ ..................................................... F16L 3/00
(52) U.S. Cl. ........................... 137/344; 137/351; 137/899
(58) Field of Search ..................................... 137/899, 344, 137/351

(56) References Cited

U.S. PATENT DOCUMENTS

| | | | | |
|---|---|---|---|---|
| 3,709,251 | * | 1/1973 | Manor | 137/343 |
| 4,041,974 | * | 8/1977 | Keiser | 137/899.3 |

* cited by examiner

*Primary Examiner*—A. Michael Chambers
*Assistant Examiner*—Thomas L. McShane
(74) *Attorney, Agent, or Firm*—Boniard I. Brown

(57) ABSTRACT

A portable erectable tower has a body, typically a tank, a base frame, and forward and rearward pairs of legs, the legs of each pair disposed on opposite sides, and a brace with two sections hinged for one-way articulation to extend coaxially to prevent downward movement of the body and to articulate upwardly to enable lowering of the tower body with actuators to act on the pairs of legs and the brace sections for raising and lowering the tower.

33 Claims, 4 Drawing Sheets

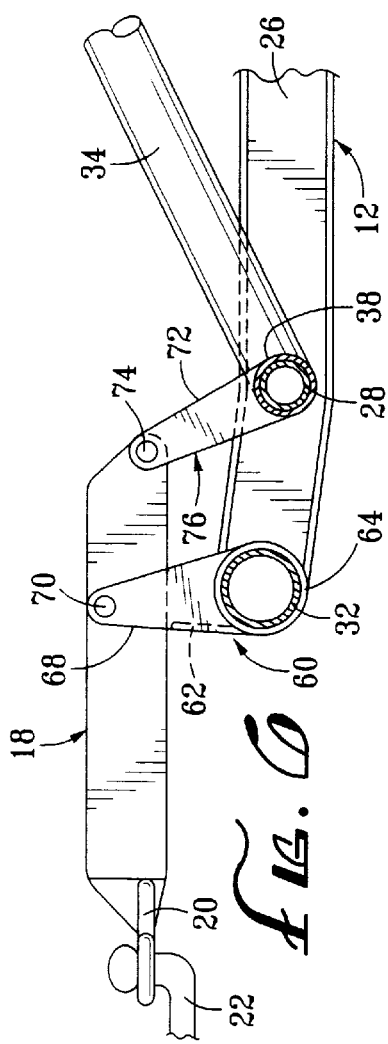
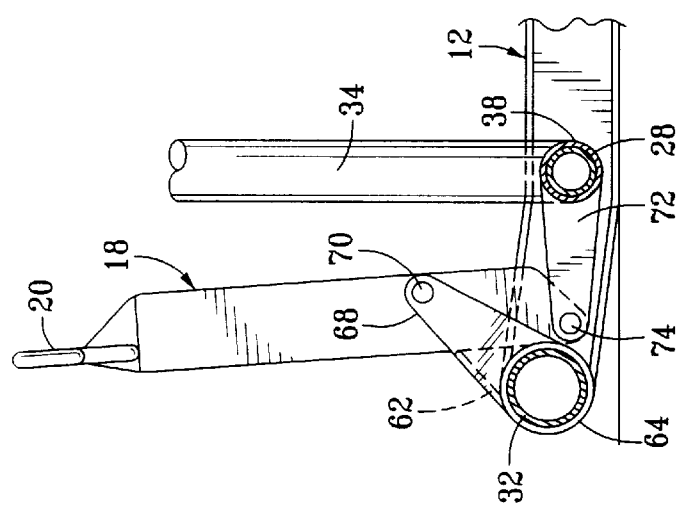
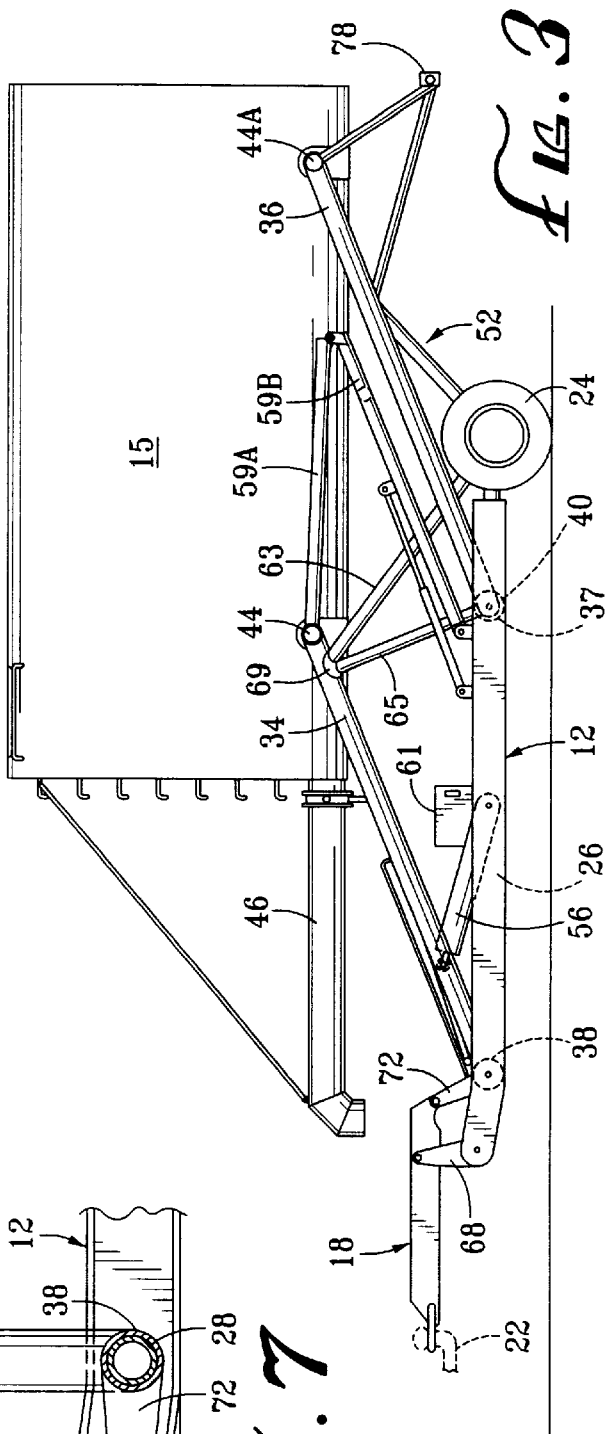

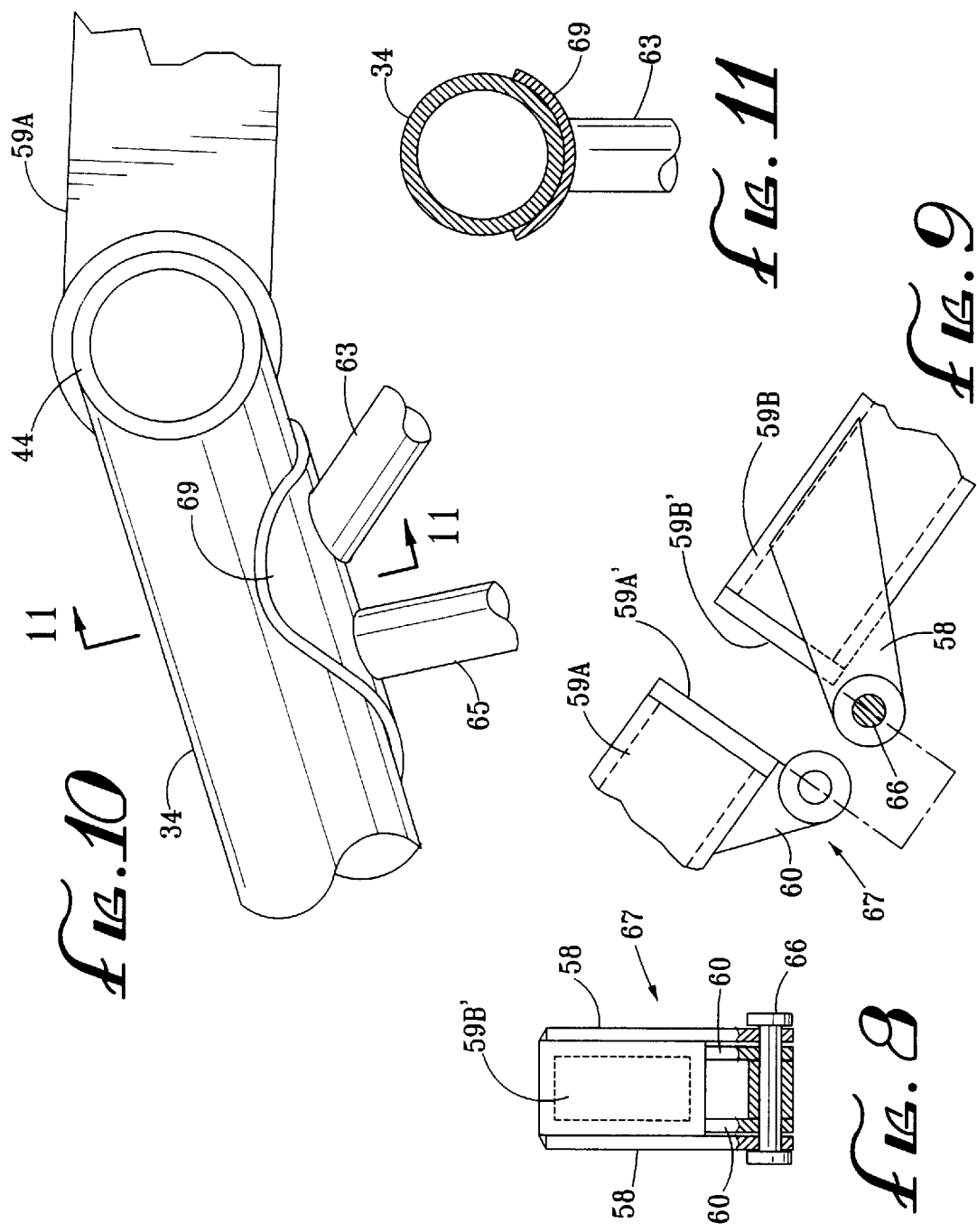

PORTABLE ERECTABLE TOWER

RELATED APPLICATIONS

Reference is made to my Provisional Application No. 60/160,854, filed Oct. 21, 1999, entitled Mobile Collapsible Tank Tower.

BACKGROUND

The present invention relates generally to mobile supports or towers, and particularly to improvements in such towers of the kind described in my earlier U.S. Pat. Nos. 4,041,974, 3,407,836 and 3,315,921.

For optimized effectiveness, water towers of the character described must satisfy the requirements of the applications in which they are utilized. For example, they must be quite mobile to be easily transported from one site to another. They must be adapted to being landed and erected on roughly cleared ground without auxiliary ditching or hand shoveling. The tower must be capable of erection to a height such that the water tank is elevated sufficiently above ground level to dispose a spout for effective use. The tower should be capable of being quickly erected and collapsible by one person.

The present invention provides fail-safe operation, with minimum possibility of inadvertent lowering or collapsing, by the provision of an hydraulic actuator system and control arrangement for automatically applying appropriate pressures to opposite sides of an elevating actuator and lowering actuators, operable by an operator utilizing a single control, preferably. The control is preferably spring loaded to return to a central position upon release to maintain the system in status quo, thus to prevent collapse or undesired erection. The system essentially avoids hazards and damages resulting from human error or omission.

BRIEF DESCRIPTION OF THE DRAWINGS

FIG. 3 is a side elevational view of the portable water tower of FIG. 1 in its lowered travel configuration;

FIG. 6 is an enlarged elevational view of a hitch tongue and tongue extension and retraction device utilized with the invention;

FIG. 7 is a view similar to the view of FIG. 6, showing the hitch tongue in retracted position;

FIG. 8 is a sectional view showing hinge structure between two sections of a brace utilized with the present invention;

FIG. 9 is an elevational exploded view showing details of a hinge between adjacent sections of the brace utilized with the invention;

FIG. 10 is a partial view showing a support cup in relation to a leg member, according to the invention; and FIG. 11 is a sectional view taken at line 11—11 in FIG. 10.

DESCRIPTION OF THE PREFERRED EMBODIMENT

Figure 1:
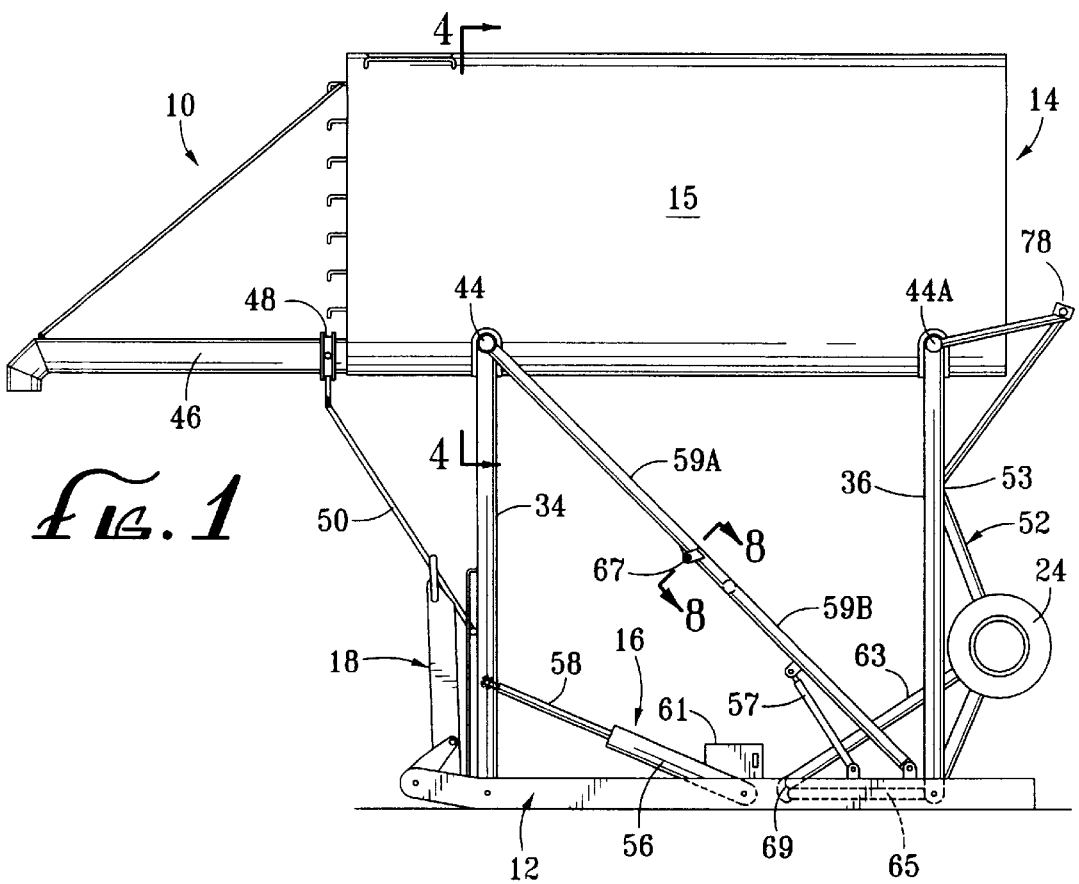
FIG. 1 is a side elevational view of a portable water tower according to the invention.
Figure 2:
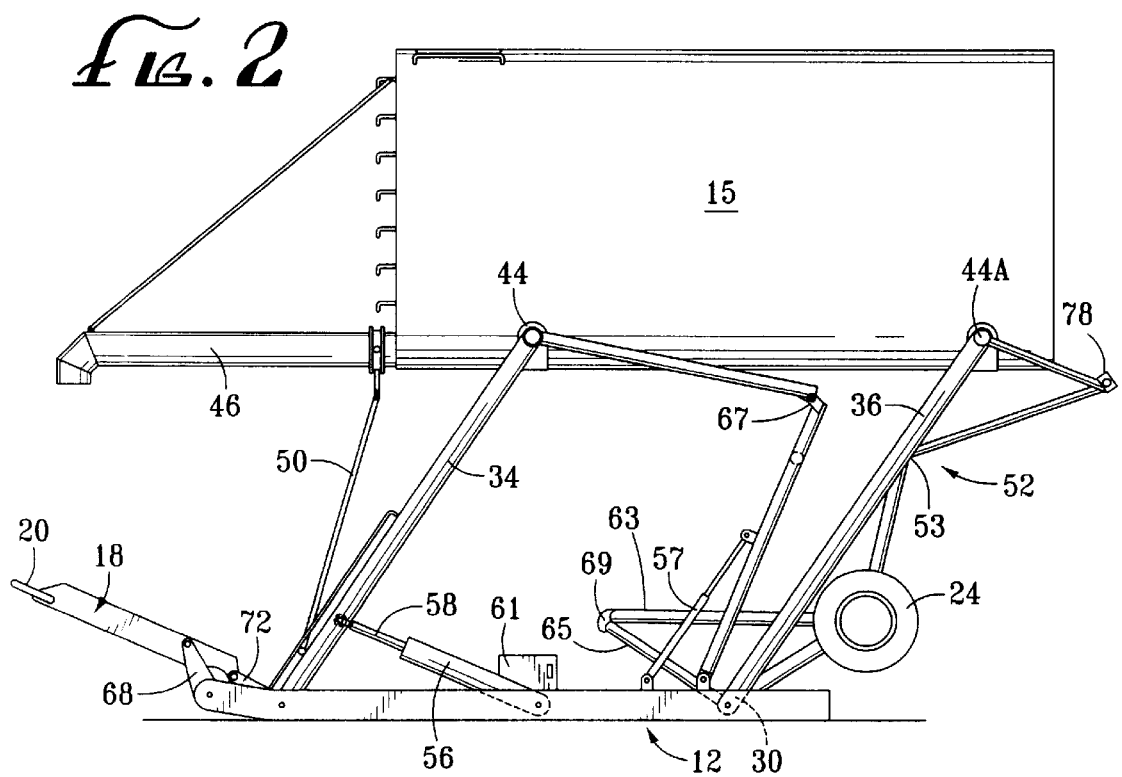
FIG. 2 is a side elevational view of the portable water tower of FIG. 1, showing the apparatus disposed between its elevated and lowered positions.

The illustrated mobile tower 10 of the invention comprises a base frame 12 having forward and rearward ends and normally upper and lower sides, a collapsible tower body 14 above the frame, actuator means for effecting raising and lowering of the tower structure between its erect position of FIG. 1 and its collapsed position of FIG. 2, a hitch tongue 18 at the front end of the frame having coupling means 20 for engagement with the trailer hitch 22 of a towing vehicle, and ground wheels 24 at the rear of the body and frame for supporting the tower while it is being towed by the vehicle.

The base frame 12 has longitudinal frame members 26 rigidly joined at their front and rear ends by tubular cross members or tubes 28, 30, 32. The collapsible tower structure 14 comprises first and second supporting legs 34, 36 pivotally joined at their lower ends to the frame 12 by pivotal connections 37 formed by sleeves 38, 40 which are welded or otherwise rigidly secured to the lower ends of the legs and are rotatably supported on the frame by cross tubes 28, 30, respectively, between the longitudinal frame members 26. Extending between the upper ends of the legs 34 and between legs 36 are pivotal connections 44, 44A. The particular tower body 14 illustrated is a water tower for land fill operations, and a water tank 15 has a forward spout 46 containing a shut-off valve 48 operable by a valve actuating rod 50.

The pivot axes of the pivot connections 37, 44 parallel one another and extend transversely of the base frame 12. Accordingly, the tower structure 14 is swingable forwardly and upwardly relative to the frame 12 to the erect position of use of the tower structure shown in FIG. 1. The tower structure is swingable rearwardly and downwardly relative to the frame to the collapsed towing position of the tower structure shown in FIG. 3. In the erect use position of the structure, its legs 34, 36 stand upright on the frame 12. In the collapsed position of the structure, its legs incline rearwardly of the frame, as shown.

Rear ground wheels 24 are mounted on a carriage 52 rigidly attached at 53 to rear legs 36 of tower structure 14, whereby the wheels are raised and lowered with the carriage relative to frame 12. Carriage 52 is pivotable with pivot bar 44A (later described). Upon elevation of the water tank 15, the wheels are elevated relative to the frame, and the frame 12 is lowered into supporting contact with the ground (FIG. 1). Upon lowering of the tank, the wheels 24 rest on the ground, base frame 12 is elevated (FIG. 3), and carriage rods 63, 65 on opposite sides of the carriage engage and support front legs 34. As shown in FIGS. 10 and 11, arcuate support cups 69, one at the end portion of each of carriage rods 63, 65 support the upper portions of the front legs when in their downward positions of FIG. 3, thus to provide structural support for the front legs relative to the base frame and wheel carriage.

Figure 4:
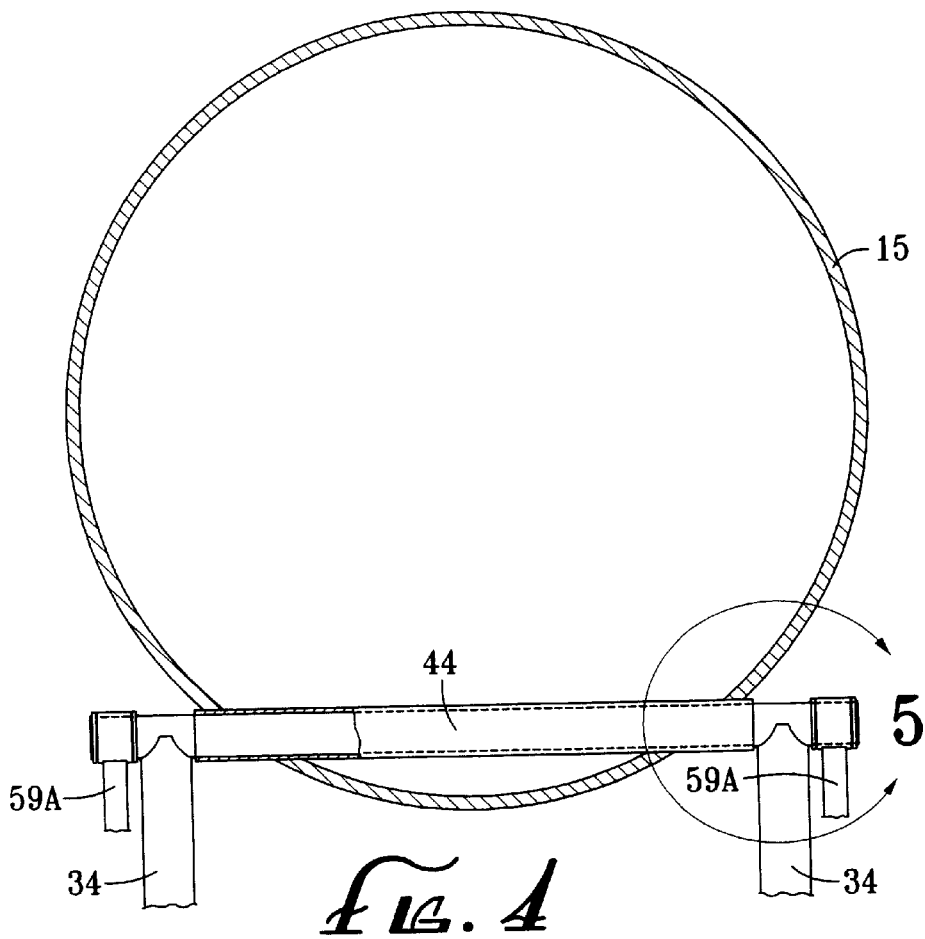
FIG. 4 is an enlarged sectional view taken at line 4—4 in FIG. 1.
Figure 5:
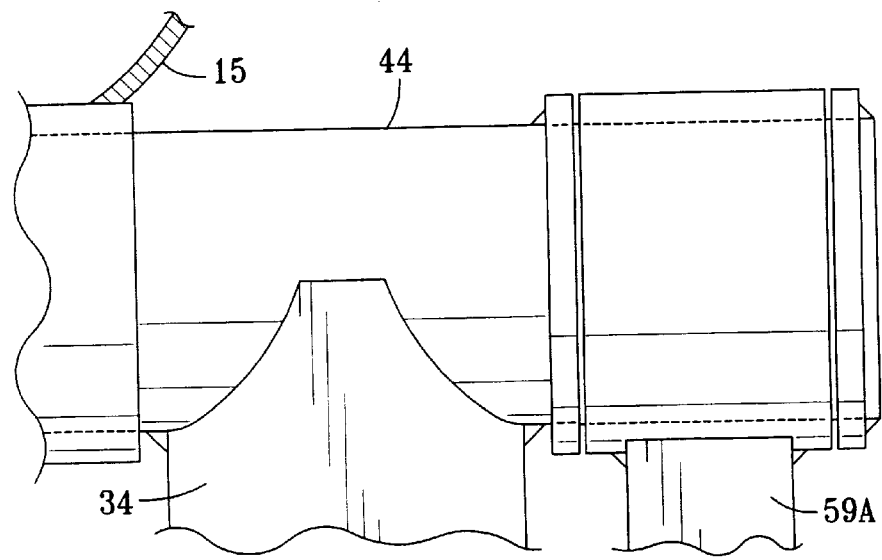
FIG. 5 is an enlarged view of a portion of FIG. 4 taken at circle 5.

As shown in FIG. 4, the pivot bars 44 and 44A are mounted in sleeves extending through front and rear lower portions of the tank 15. Each of front legs 34 is secured, as by welding, to pivot bar 44 and has the lower sections pivotally mounted at their opposite ends to base frame 12. Similarly, each of rear legs 36 is pivotally mounted to a similar pivot bar 44A and has opposite ends secured at a rear portion of base frame 12.

The tank is maintained in the erect position of FIG. 1 by front legs 34, rear legs 36, and a pair of brace sections 59A, 59B which are hinged together and abut each other in a self-locking relation to prevent bending in a downward direction.

Raising and lowering of the tank between its lowered position of FIG. 3 and its raised position of FIG. 1 are accomplished by operation of a system comprising legs 34, 36, hydraulic actuator 56 and its rod 58, hydraulic actuators 57, and brace sections 59A, 59B. Referring to FIGS. 8 and 9, the brace sections are hinged at a pivot pin 66 so that when the end portions 59A, 59B are in abutting relation, the braces cannot articulate downwardly, but only upwardly. This provides a self-locking arrangement when the brace sections are thus aligned and their ends are in abutment, as will be understood from the geometry of the parts. Inadvertent or accidental lowering or collapse is thus prevented. A pair of brace members 59A, 59B is disposed on each side of the apparatus, with each brace 59A being pivotally mounted on the front pivot bar 44 (FIG. 4) and the braces 59B being pivotally mounted on lower frame 12, as shown.

Hydraulic actuators 56 and hydraulic actuators 57 are double-acting actuators, different pressures being applied to opposite sides of the piston of each actuator. The actuators are interconnected with hydraulic connections and a control mechanism. The control mechanism is indicated generally at 61. Details of the hydraulic actuators, hydraulic connections, and the control mechanism are known in the art and are not shown in the drawings.

The hydraulic actuator system utilized is commonly referred to as a four-way system and has hydraulic connections for exerting pressure on both sides of the piston of each actuator, different predetermined pressures being applied to each piston of each actuator in use. Actuating pressure being applied at one side of an actuator piston and the lower pressure at the other side of the piston, there is exit of oil from the lower pressure side, and a small reservoir is provided. The lower pressure on the non-actuating side of an actuator piston prevents sudden application of force, sudden movement, or even collapse of the apparatus.

Preferably, a single operating control, such as a handle, is utilized by an operator in actuating one or more electric motors to operate one or more hydraulic pumps to effect different pressures in two directions on each actuator piston. By operating such control., pressure may be applied to actuator 56 while pressure is relieved in actuators 57, or conversely. Thus, actuator 56 may be pressurized to effect pivotal movement of the legs 34, 36 to erect the apparatus into its position of FIG. 1. Smooth operation is provided by the relatively lower pressure on the piston side opposite from the side on which actuating pressure is applied. This pressure on the non-actuating side of the piston assures smooth operation and avoids collapse of the apparatus.

A typical pressure for actuator 56 moving the legs to raise the apparatus would be 1400 psi.

Prior to the application of erecting pressure in actuators 56, pressure in actuators 57, one on each side of the apparatus, is relieved, thereby enabling articulation of the brace sections at pins or hinges 67, whereby the brace sections do not resist their articulation. In elevating the tank, the legs are pivotally tilted upwardly while the brace sections are moved into their aligned, abutting configuration of FIG. 1.

In lowering the tank, actuators 57 are operated to act on the brace sections 59A, 59B to urge them generally upwardly for bending or articulating them relative to each other (FIG. 2) to enable lowering of the tank, while concurrently relieving pressure in actuator 56. Pressure in actuators 57 may typically be about 500 psi while pressure is relieved in actuator 56 to allow tilting and downward movement of the legs 34, 36. Back pressure of 300 psi may typically be applied at the non-actuating side of the pistons of actuator 56, without which back pressure the apparatus might collapse.

The control handle of the hydraulic apparatus is preferably spring-loaded to return automatically to a central position when the control handle is released by an operator, thereby stopping all hydraulic operation and maintaining the apparatus in its status quo as of the time of release of the control handle. This serves to prevent damage to apparatus and injury to persons in emergency situations.

A needle valve or valves may preferably be utilized to enable an operator to establish appropriate flow rates in hydraulic lines of the system for effecting relatively slow downward movement of the tank and tower, without collapsing. Once such needle valves are appropriately adjusted, repeated operation of the system normally requires no further adjustment.

Hitch tongue 18 (FIGS. 2 and 3) comprises a metal bar which is aligned in the longitudinal center plane of the tower base frame 12 and is pivotally supported on the front frame cross tube 32 by means 60. This tongue supporting means comprises a yoke 62 rigid on a sleeve 64 which is rotatably mounted on the center of the tube 32. Lugs (not shown) on the tube position the sleeve axially on the tube. Yoke 62 has arms 68 which straddle the hitch tongue 18 between its ends, and close to its rear end, are pivotally attached to the tongue by a pivot 70 whose axis parallels the pivot axis of the tower structure 14. Rigid on the front tower pivot sleeve 38 are a pair of arms 72 which extend substantially normal to the front tower legs 34 and straddle the rear end of the tongue 18. Arms 72 are attached to the tongue 18 by a pivot 74 parallel to pivot 70. Arms 72 and pivot 74 thus provide a connection 76 between the tongue and the tower structure 14.

The tongue arrangement described above is such that raising of the tower structure 14 to its erect position rotates the hitch tongue 18 upwardly to its upstanding retracted position of FIGS. 1 and 4. Lowering of the tower structure to its collapsed position rotates the tongue downwardly to its horizontal towing position of FIGS. 2 and 3. In this latter towing position of the tongue, its coupling means 20, which is a ring, is disposed for engagement over the hitch 22 of a towing vehicle. This engagement of the tongue with the vehicle hitch supports the front end of the tower base frame 12 in an elevated position above the ground. From the earlier descriptions, it will be recalled that when the tower structure 14 is collapsed, the rear end of the frame is supported above the ground on the wheels 24. Accordingly, lowering of the tower structure conditions the mobile tower 10 to be towed by the towing vehicle.

The tower structure 14 is raised to its erect position of FIG. 1 with the hitch tongue 18 coupled to the towing vehicle hitch 22. As the tower structure elevates, the tongue undergoes upward rotation relative to the frame 12. This relative upward rotation of the tongue results in initial lowering of the front frame end into supporting contact with the ground and thereafter in upward disengagement of the tongue coupling ring 20 from the vehicle hitch 22 during final upward rotation of the tongue to its fully retracted position of FIGS. 1 and 4. Lowering of the tower structure 14 with the tower 10 in towing relation behind the towing vehicle causes initial downward rotation of the hitch tongue to a position wherein the tongue coupling ring engages downwardly over the vehicle hitch 22 and thereafter in elevation of the front end of the frame 12 off the ground during final rotation of the tongue to its fully extended position of FIGS. 2 and 3.

From the earlier description, it will be recalled that the rear end of the base frame is lowered into contact with the ground when the tower structure 14 is raised, and raised from contact with the ground into supporting relation on wheels 24 when the tower structure is lowered, It will be understood that assuming the tower 10 is initially in its erect use configuration of FIG. 1, coupling of the tower to a towing vehicle for transportation to another location of use is accomplished by backing the vehicle into towing relation to the front end of the tower frame 12 and then operating the tower actuator means 16 to lower the tower structure 14 to its collapsed position. During this lowering operation the rear frame is raised off the ground onto the wheels 24, the hitch tongue 18 is rotated downwardly into engagement with the vehicle hitch 22 and the front frame end is elevated off the ground to permit towing of the tower by the vehicle. When the tower structure is raised at the new location of use, the hitch tongue is disengaged upwardly from the vehicle hitch and the base frame is lowered into supporting contact with the ground.

According to another feature of the invention, a rear reflector or tail light support 78 may be attached to the tower structure 14 and the wheel carriage 52 in the manner shown in FIGS. 1 and 2 to assume an operative position at the rear of the tower 10 when the latter is placed in its towing configuration of FIG. 2.

It will be understood that various changes and modifications may be made from the preferred embodiments discussed above without departing from the scope of the present invention, which is established by the following claims and equivalents thereof.

The inventor claims:

1. A tower apparatus, comprising:
   a body having first and second ends, and first and second opposite sides,
   a base frame having first and second ends,
   first and second pairs of legs in spaced-apart relation, each pair of legs being pivotable relative to the body and relative to the base frame, a leg of each pair being disposed on each of the first and second sides of said body,
   at least one brace extending diagonally between upper portions of the first pair of legs and lower portions of the second pair of legs, said at least one brace comprising upper and lower sections connected by a one-way knee hinge to articulate only generally upwardly and to resist downward articulation to prevent lowering of the tower body,
   actuator means operable to act in a first direction on one of the pairs of legs to move the legs to pivot generally downwardly, while the other pair of legs are urged generally downwardly by force exerted by their pivotal connections with the body and the base frame, and
   said actuator means being operable in a second opposite direction to move the first pair of legs to pivot generally upwardly to generally vertical orientations and to move said brace sections from their articulated relatively bent positions to their aligned positions wherein they are self-locking with their end portions in abutting relation to prevent downward movement of the tank tower.

2. Apparatus according to claim 1, wherein said tower is portable, and further comprising:
   a wheel carriage having ground wheels thereon and mounted on one of said first and second pairs of legs to pivot about the base frame to move the ground wheels generally downwardly to engage a supporting ground surface and to raise the base frame from the ground surface.

3. Apparatus according to claim 1, wherein:
   at least one brace actuator pivotally connected with the base frame and with said lower brace section operable to act on said lower brace section to urge it in a generally upward direction to articulate the brace sections to enable lowering of the tower body.

4. Apparatus according to claim 1, wherein:
   the second pair of legs are tilted with the first set of legs by a parallel bar mechanism comprising the body, the base frame, and the first and second pairs of legs.

5. Apparatus according to claim 1, wherein:
   said first and second pairs of legs have pivotal connections spaced apart on the body and on the base frame, comprising pivot shafts extending transversely of the tower body and base frame.

6. Apparatus according to claim 1, wherein:
   said one-way hinge comprises a hinge knee extending outwardly of the brace sections, and the brace sections having flat end surfaces for abutting together when the sections are coaxial.

7. Apparatus according to claim 1, wherein:
   said actuator means comprises two double-acting hydraulic actuators, one disposed on each side of the tower body, said actuators being pivotally connected with the base frame and with lower portions of said first legs.

8. Apparatus according to claim 1, and further comprising:
   a hitch tongue at an end portion of the base frame and having coupling means for releasable engagement with a vehicle trailer hitch.

9. Mobile tower apparatus comprising:
   a body having first and second ends, and first and second opposite sides,
   a base frame having forward and rearward ends,
   a first pair of legs, one leg being disposed on each side of said body, and a second pair of legs having a leg disposed on each side of the body,
   the first pair of legs being pivotally connected adjacent to the first end of the body, and the second pair of legs being pivotally connected adjacent to the second end of the body,
   a brace having an upper section pivotally mounted relative to a first portion of the tower body, and a second section pivotally mounted relative to the base frame, said sections being joined by a one-way knee hinge to articulate only generally upwardly to prevent articulation downwardly,
   actuator means operable to act in a first direction on the first pair of legs to act thereon to tilt the first pair of legs generally downwardly, said second pair of legs being urged generally downwardly by force exerted at their pivotal connections on with the body and the base frame,
   said actuator being operable in a second direction to exert force to move the first pair of legs to pivot generally upwardly to vertical orientations, and to move the brace sections from their articulated positions to their aligned positions wherein they are self-locking with their ends in abutting relation to prevent downward articulation and to prevent downward movement of the tower body, and
   a wheel carriage with ground wheels thereon and mounted on one of said pairs of legs to pivot therewith about the base frame, said wheel carriage pivoting generally downwardly to engage a supporting ground surface and to pivotally raise the base frame above the ground surface.

10. Apparatus according to claim 9, and further comprising:
   at least one brace actuator pivotally connected with the base frame and with a lower brace section and operable to act on said lower brace section to urge it in a generally upward direction to articulate the brace section to enable lowering of the tower body.

11. Apparatus according to claim 9, wherein:
   said second pair of legs are tilted with the first pair of legs by a parallel bar mechanism comprising the body, the base frame, and the first and second legs.

12. Apparatus according to claim 9, wherein:
   said wheel carriage is welded to the second pair of legs.

13. Apparatus according to claim 9, wherein:
   the first and second pairs of legs have pivotal connections in generally parallel spaced-apart relation and transversely of the tower body and base frame, said pivotal connections comprising pivot shafts extending through lower portions of the body.

14. Apparatus according to claim 9, wherein:
   said hinge knee extends outwardly of the brace sections, and the brace sections have flat end surfaces to abut together when the sections are coaxially disposed.

15. Apparatus according to claim 9, wherein:
   said tower body comprises a water tank having a discharge outlet and a discharge control valve.

16. Apparatus according to claim 9, wherein:
   said actuator means comprises two double-acting hydraulic actuators, one on each side of the tower body and pivotally connected with the base frame and with actuator rods extending to pivotally engage lower portions of the first pair of legs.

17. Apparatus according to claim 9, and further comprising:
   a hitch tongue at an end portion of the base frame and having coupling means for releasable engagement with a vehicle trailer hitch.

18. Apparatus according to claim 9, wherein:
   said actuator means comprises two double-acting actuators on opposite first and second sides of the body, to act on the front legs to move them pivotally about their pivot axes at the base frame and tower body and to move first and second pairs of legs rearwardly and downwardly by a parallel bar mechanism comprising the front, and rear legs, the tower body, and the base frame, while articulating the brace sections to enable lowering of the tower body to a collapsed position.

19. Apparatus according to claim 9, and further comprising:
   a support cup on the wheel carriage at each side of the tower body to support upper portions of each of the first pair of legs when the tower is in its lowered collapsed position.

20. Apparatus according to claim 9, and further comprising:
   at least one rod member extending rearwardly from the second pair of legs, and
   a lamp on said at least one rod member to provide a warning light.

21. Mobile tower apparatus comprising:
   a body having forward and rearward ends and having first and second opposite sides,
   a base frame having forward and rearward ends,
   forward and rearward pairs of legs, one leg of each pair being disposed on opposite first and second sides of the tower,
   the legs of each of said pairs of legs being pivotally mounted for movement together relative to the body and relative to the base frame, the forward and rearward pairs of legs being pivotally mounted relative to the body and relative to the base frame at spaced-apart positions on the body and the base frame,
   two braces extending on both sides of the body between pivotal mountings at a forward portion of the tower body and at a rearward portion of the base frame, each brace comprising an upper brace section pivotal relative to the tower body, and a second brace section pivotally mounted relative to the rearward portion of the base frame, said brace sections being joined by a one-way knee hinge to articulate only upwardly and to prevent downward articulation to prevent lowering of the tower body,
   actuator means pivotally connected with the front legs and with the base frame to act in a first direction to urge the front legs to pivot generally upwardly and forwardly to their vertical body supporting orientations, while the brace sections are moved from their aligned articulated positions to their aligned abutting positions to prevent downward articulation of the brace sections to prevent downward movement of the tower body, and
   the actuator means being actuatable in a second direction to move the legs generally downwardly while the brace sections are articulated generally upwardly to enable lowering movement of the tower body.

22. A tower apparatus according to claim 21, and further comprising:
   a wheel carriage having ground wheels thereon and mounted on the rear legs and pivotal therewith about a rear portion of the base frame, said wheel carriage pivoting with the rear legs relative to the tower body and base frame into a rearward downward position wherein said wheels engage a supporting ground surface to raise the base frame above the supporting ground surface while the tower is lowered to its collapsed position.

23. Apparatus according to claim 21, and further including:
   at least one brace actuator pivotally connected with the base frame and with said lower brace section, and operable to act on said lower brace section to urge it generally upward to articulate the brace sections to enable lowering of the tower body.

24. Apparatus according to claim 21, wherein:
   said brace sections are articulated generally upwardly and rearwardly to enable lowering of the tower body.

25. Apparatus according to claim 21, wherein:
   said wheel carriage members are welded to the rear legs.

26. Apparatus according to claim 21, wherein:
   the forward and rearward pairs of legs have pivotal connections in generally parallel spaced-apart relation and transversely of the tower body and base frame, said pivotal connections comprising pivot shafts extending through lower portions of the body.

27. Apparatus according to claim 21, wherein:
   said hinge knee extends outwardly from the brace sections, and the brace sections have flat end surfaces to abut together when the sections are coaxially disposed.

28. Apparatus according to claim 21, wherein:
   the forward legs are on opposite sides of the body and interconnected rigidly with a transverse pivot shaft extending through a forward portion of the body, and said rear legs are interconnected by a transverse shaft extending through a rear portion of the tower body.

29. Apparatus according to claim 21, wherein:

said tower body comprises a water tank having a discharge outlet and a discharge control valve.

30. Apparatus according to claim 21, wherein:

said actuator means comprises two double-acting hydraulic actuators, one on each side of the tower body and pivotally connected with the base frame, the actuators having actuator rods extending into pivotal engagement with lower portions of the front legs.

31. Apparatus according to claim 21, and further comprising:

a hitch tongue at the front of the base frame and having coupling means for releasable engagement with a vehicle trailer hitch.

32. Apparatus according to claim 21, and further comprising:

a support cup on the wheel carriage at each side of the tower body to support upper portions of each of the front pair of legs when the tower is in its lowered collapsed position.

33. Apparatus according to claim 21, and further comprising:

at least one rod member extending rearwardly from the rearward pair of legs, and a lamp on said at least one rod member to provide a warning light.

* * * * *